Patented Dec. 21, 1937

2,103,187

UNITED STATES PATENT OFFICE 2,103,187

METHOD FOR DETECTING SMALL QUANTITIES OF GAS

August Gustav-Adolf Schröter, Hamburg, Germany, assignor to Otto Heinrich Dräger, Lubeck, Germany No Drawing. Application May 24, 1934, Serial No. 727,373. In Germany May 24, 1933

4 Claims. (Cl. 23—232)

This invention relates to a method for detecting or determining small quantities of gas or vapor in air or other gases.

With known methods for this purpose the possibility of detecting small gaseous admixtures with air or other gases finds its natural limit in the small or even minute quantity of the gas to be detected. It is a fact that noxious or poisonous gases may have a toxic effect in many cases even if they are not present in that degree of concentration which is necessary for one of the known test-methods to be successfully applied. Further in using the known methods it is sometimes necessary to take large samples of air containing the noxious admixtures and to transport these large samples from the place of origin to the place of testing which also is a difficult thing to do.

The invention overcomes these difficulties by the procedure of enriching by adsorption the gas to be detected upon a gas-adsorbing medium and there to making its presence perceptible by applying a testing medium. As a gas-adsorbing medium, e. g., white or colorless gels may be used, preferably silica gel. The gaseous mixture to be tested is sucked through these gels. The gel may be impregnated or soaked with the testing medium before the gaseous mixture is sucked through or after this procedure.

Besides silica gel, e. g., the gel of aluminum hydroxide or similar gels may be used. Upon the white or colorless gels a change in color effected by the gas looked for especially is clearly recognizable.

Example 1

Granulated silica gel is impregnated with a diluted solution of cobaltous sulphate (1:100) in water and about 20 cubic centimetres of the impregnated gel which has a light pink color is introduced into a glass pipe of say 1 to 2 centimetres inner diameter. If through this pipe an air stream containing ammonia is sucked the first layer of gel turns a blue color. If on the other hand a piece of blotting paper would be used for the same purpose the change in color would not occur at all or would occur only after a much longer time.

Example 2

Finely granulated gel of titanic oxide is introduced into a glass pipe of say 1 to 2 centimetres inner diameter and a quantity of air to be tested for phosgene is sucked through this pipe. The phosgene is enriched by adsorption when passing through the first layers of gel so that it becomes possible to perceive it rather quickly by the change of color when a solution of diphenylamine and p-diamethylaminobenzaldehyde in xylole is brought into contact with the gel after the sucking operation. With this method it is possible to detect the phosgene more quickly and in far smaller quantities than would be possible by using a piece of blotting paper impregnated with the same testing media.

The new method has the further advantage that only the taking of the sample need be carried out at the place of origin and that the test itself may be carried out, e. g., in the case of Example 2 at any suitable place. Further the new method makes it possible to get lasting proofs of the presence of noxious gases.

I claim:—

1. In a method for verifying the presence of small quantities of adsorbable gas or vapor in air or other gases, the steps which comprise passing the air or gases containing the adsorbable gas or vapors to be verified through a solid gas-adsorbing medium preferentially adsorbing said gas or vapor, whereby the gas or vapor to be verified is concentrated upon the gas adsorbing medium, and then applying to the medium a substance which will react with the gas or vapor concentrated upon the medium to produce a change in the appearance of the medium containing the substance.

2. In a method for verifying the presence of small quantities of adsorbable gas or vapor in air or other gases, the steps which comprise sucking the gaseous mixture to be tested through a white gas-adsorbing gel preferentially adsorbing said gas or vapor and then soaking said gel with a testing medium.

3. In a method for verifying the presence of small quantities of adsorbable gas or vapor in air or other gases, the steps which comprise sucking the gaseous mixture to be tested through a colorless gas-adsorbing gel preferentially adsorbing said gas or vapor and then soaking said gel with a testing medium.

4. In a method for verifying the presence of small quantities of adsorbable gas or vapor in air or other gases, the steps which comprise sucking the gaseous mixture to be tested through silica gel and then soaking said gel with a testing medium.

AUGUST GUSTAV-ADOLF SCHRÖTER.